United States Patent [19]

Tomikawa

[11] Patent Number: 5,079,628
[45] Date of Patent: Jan. 7, 1992

[54] NETWORK SYSTEM FOR TRANSMITTING DATA BY RADIO SIGNALS

[75] Inventor: Masataka Tomikawa, Tokorozawa, Japan

[73] Assignee: Kabushiki Kaisha Toshiba, Kawasaki, Japan

[21] Appl. No.: 288,923

[22] Filed: Dec. 23, 1988

[30] Foreign Application Priority Data

Dec. 28, 1987 [JP] Japan .................... 62-334757
Aug. 25, 1988 [JP] Japan .................... 63-211381

[51] Int. Cl.[5] .............................................. H04K 1/00
[52] U.S. Cl. .................................. 358/86; 455/5; 455/20
[58] Field of Search ................ 455/12, 13, 15, 17, 455/32-34, 54-56, 3, 6, 14, 2, 20, 5, 66; 379/63; 370/95.1; 340/825.06; 358/86

[56] References Cited

U.S. PATENT DOCUMENTS

| | | | |
|---|---|---|---|
| 4,506,383 | 3/1985 | McGann | 455/17 |
| 4,720,873 | 1/1988 | Goodman et al. | 455/12 |
| 4,764,979 | 8/1988 | Noguchi | 455/15 |
| 4,837,858 | 6/1989 | Ablay et al. | 455/15 |
| 4,876,742 | 10/1989 | Vacon et al. | 455/66 |
| 4,891,633 | 1/1990 | Imazeki et al. | 358/86 |
| 4,982,430 | 1/1991 | Frezza et al. | 455/5 |

*Primary Examiner*—Curtis Kuntz
*Attorney, Agent, or Firm*—Finnegan, Henderson, Farabow, Garrett, and Dunner

[57] ABSTRACT

A plurality of radio networks for transmitting data include a head end unit and a plurality of work stations. The head end unit receives a radio signal output from a given work station, converts the reception signal into a radio signal of a different frequency, and re-radiates the signal to all the work stations. Each work station includes a data processor, a receiving section for receiving and demodulating the radio signal from the head end unit to obtain data supplied from another work station, and supplying the obtained data to the data processor, and a unit for receiving transmission data generated by the data processor, and converting the transmission data into a radio signal and radiating the radio signal, thereby transmitting the transmission data to another work station through the head end unit.

20 Claims, 6 Drawing Sheets

NETWORK SYSTEM FOR TRANSMITTING DATA BY RADIO SIGNALS

BACKGROUND OF THE INVENTION

1. Field of the Invention

The present invention relates to a network system in which a plurality of work stations transmit/receive data by radio signals through head end units.

2. Description of the Related Art

Recently, so-called work stations have been made compact and therefore used on desks of individual operators. Cables are used as a medium for mutually connecting such work stations.

In a network system adopting cable connection, however, a wiring arrangement must be changed in order to move work stations, resulting in very troublesome operation. In addition, the appearance of the cable-connected network system is not desirable.

SUMMARY OF THE INVENTION

It is, therefore, an object of the present invention to provide a network system which can be easily operated.

In order to achieve the above object of the present invention, there is provided a network system comprising:

a head end unit (1) for receiving a radio signal of a first frequency (fU), and converting the reception signal into a radio signal of a second frequency (fD) different from the first frequency (fU) and radiating the converted signal; and a plurality of work stations (WA) for performing data processing, each of the work stations (WA) comprising:

a data processing circuit (3) for performing data processing, receiving data supplied from another work station, and generating data to be transmitted to another work station;

a receiving circuit (2), connected to the data processing circuit, for receiving the radio signal of the second frequency from the head end unit (1), demodulating the radio signal to obtain data supplied from other the work station, and supplying the obtained data to the data processing circuit; and a transmitting circuit (2), connected to the data processing circuit, for receiving the transmission data generated by the data processing circuit (3), and converting the transmission data into the radio signal of the first frequency and radiating the radio signal, thereby transmitting the transmission data to the another work station through the head end unit.

According to the above arrangement, since the work stations can mutually transmit/receive data by radio signals and therefore need not be connected through wires, the network system can be easily operated.

DETAILED DESCRIPTION OF THE PREFERRED EMBODIMENTS

Embodiments of the present invention will be described in detail below with reference to the accompanying drawings.

Figure 1:
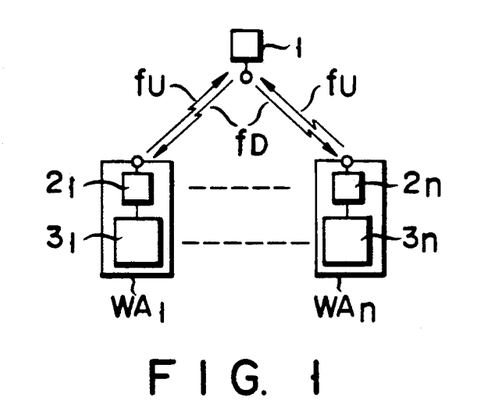
FIG. 1 is a block diagram showing an arrangement of a network system according to a first embodiment of the present invention.

Referring to FIG. 1, a first embodiment of the present invention will be described. In the first embodiment, work stations mutually transmit/receive data by radio signals.

This network system using radio signals comprises head end unit 1 and a plurality of work stations $WA_1$ to $WA_n$. Unit 1 receives a radio signal (carrier wave fU) transmitted from certain work station WA. Unit 1 converts the reception signal into a radio signal (carrier wave fD) having a frequency different from that of the reception signal. Unit 1 transmits the converted radio signal to all work stations $WA_1$ to $WA_n$. Each station WA checks a destination address of a received data frame. Each station WA receives a data frame having a destination address coincident with its own address and neglects the other data frames.

Work stations WA respectively comprise transmit/receive circuits $2_1$ to $2_n$; and terminal units $3_1$ to $3_n$ such as computer terminals and word processors.

Figure 2:
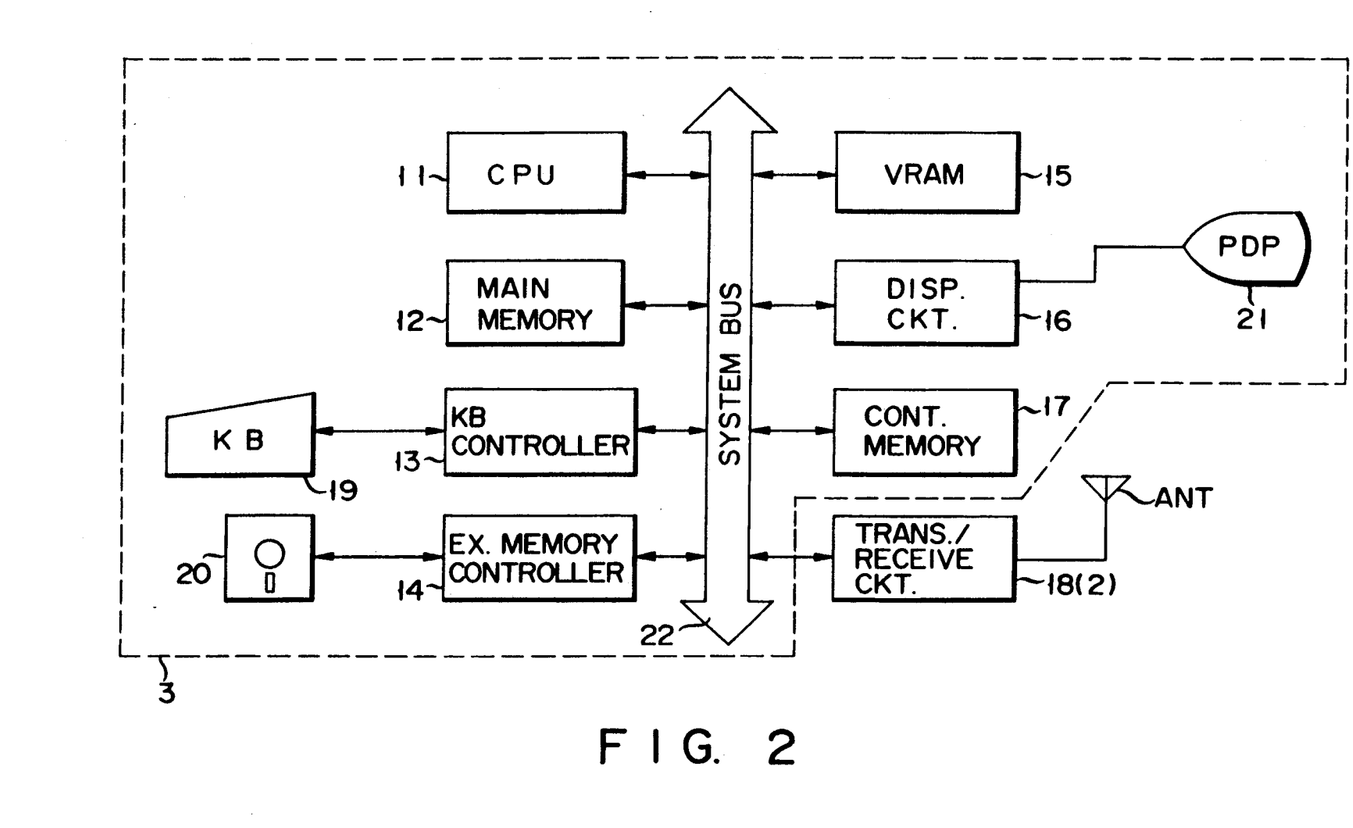
FIG. 2 is a block diagram showing an arrangement of a work station shown in FIG. 1.

An arrangement of each work station will be described below with reference to FIG. 2. In FIG. 2, CPU 11, main memory 12, keyboard controller 13, external memory controller 14, VRAM (video memory, image memory) 15, display circuit 16, control memory 17, and transmit/receive circuit 18 are connected to system bus 22. Antenna ANT is connected to circuit 18. Keyboard unit 19 is connected to keyboard controller 13. Plasma display panel (PDP) $2_1$ is connected to display circuit 16.

CPU 11 is a main unit of a control section of this system. Application software or the like is loaded in main memory 12. Keyboard controller 13 controls keyboard unit 19. External memory controller 14 controls external memory unit 20. VRAM 15 stores display data. Display circuit 16 controls PDP 21 and displays an image corresponding to the image data stored in VRAM 15. Control memory 17 stores various control data and the like. Transmit/receive circuit 18 converts transmission data supplied from bus 22 into a radio signal and outputs the signal through antenna ANT. Circuit 18 receives and demodulates a radio signal and supplies reception data to CPU 11 and the like. Keyboard unit 19 has keys so that various information can be keyed in from unit 19 to the system. Bus 22 comprises address lines, data lines, control lines and the like and transmits addresses, data and control signals between CPU 11 and the respective units. External memory unit 20 stores application programs and the like under the control of controller 14. PDP 21 displays an image with four gradation levels.

Figure 3:
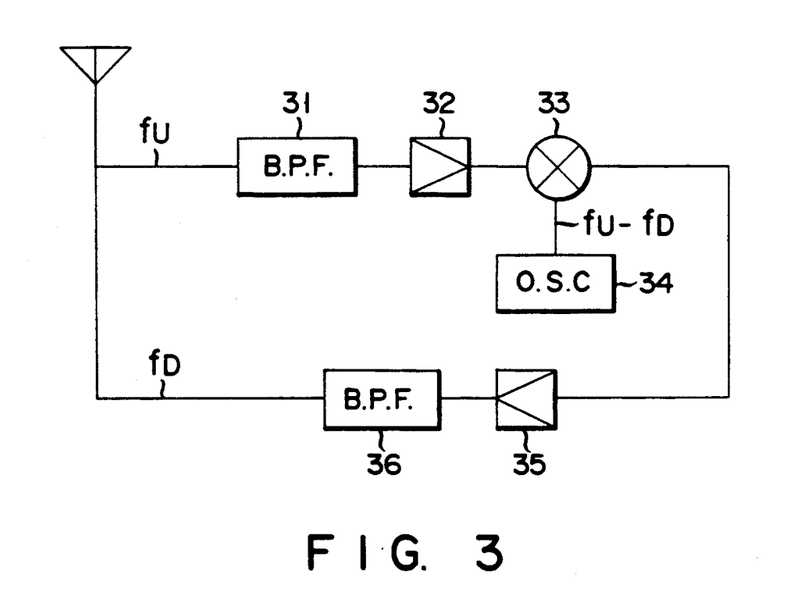
FIG. 3 is a block diagram showing an arrangement of a head end unit shown in FIG. 1.

Head end unit 1 has, for example, an arrangement as shown in FIG. 3. Signals received by antenna ANT are supplied to band-pass filter 31, and only a signal of frequency fU is extracted therein. The extracted signal is amplified by amplifier 32 and supplied to mixer 33. Mixer 33 mixes the reception signal with a signal (frequency fU minus fD) from local oscillator 34. Amplifier 35 amplifies the mixed signal. Signals of unnecessary frequencies are cut by band-pass filter 36, and a radio signal of frequency fD is output through the antenna.

Figure 4:
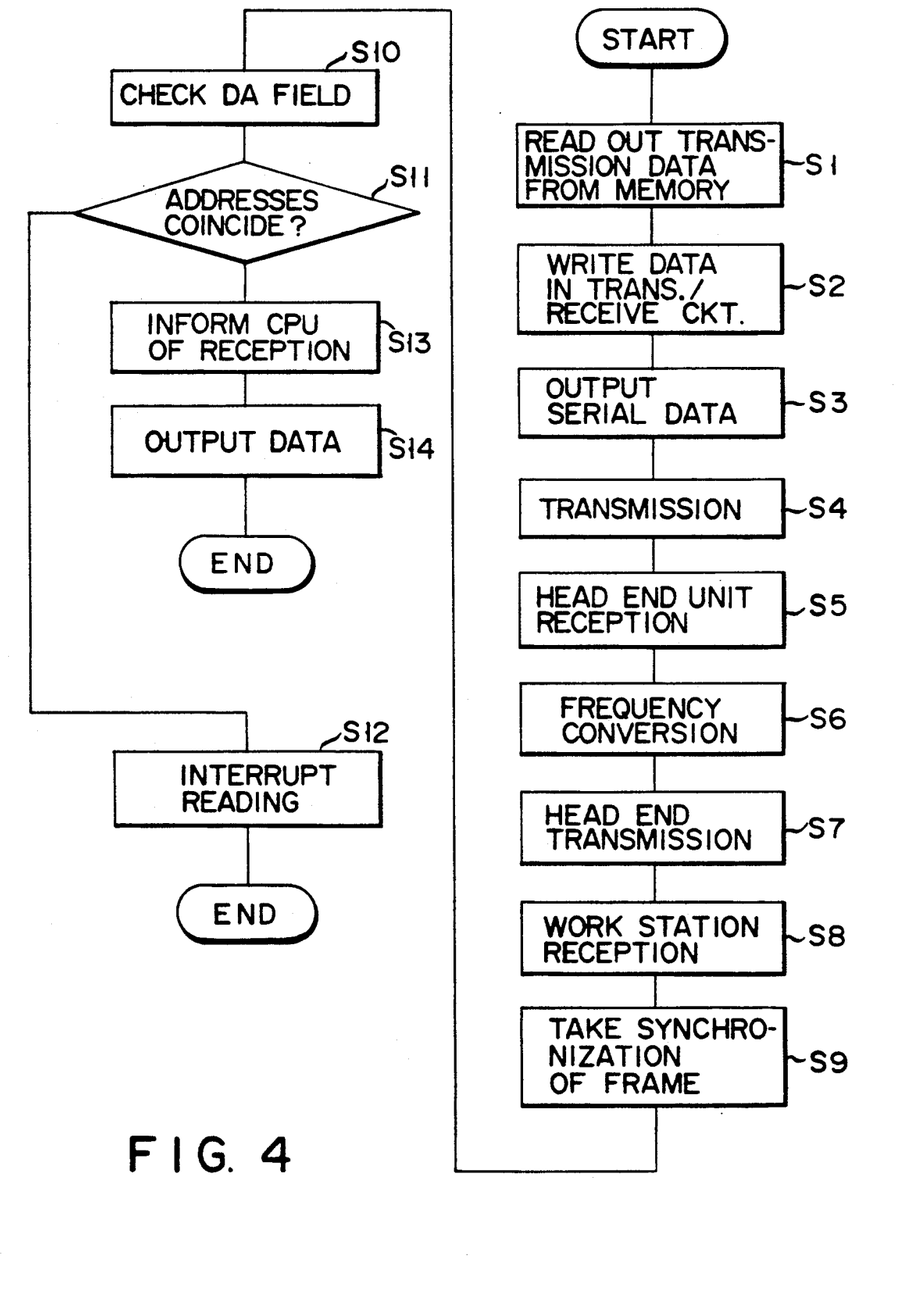
FIG. 4 is a flow chart for explaining the operation of the network system shown in FIG. 1.
Figure 5:
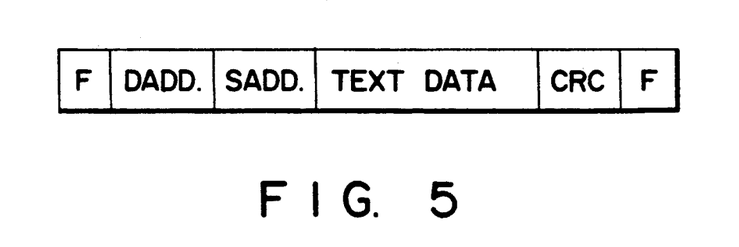
FIG. 5 is a schematic view showing a data format transmitted in the network system shown in FIG. 1.

An operation of the network system according to the first embodiment will be described below. Assume that certain work station WA requests transmission of data. CPU 11 of this work station reads out transmission data stored in main memory 12, a register in CPU 11 or the like (step S1). The transmission data has, for example, a format as shown in FIG. 5 in which a sync flag, a destination address, a source address, text data, CRC data and an end flag are arranged in the order named. CPU 11 designates an I/O address of transmit/receive circuit 18 and writes the readout data therein. In this manner, the transmission data is transferred to circuit 18 through bus 22 (step S2). Circuit 18 converts the transmission data into serial data (step S3), converts the serial data into a radio signal of frequency fU and transmits the radio signal through antenna ANT (step S4).

Head end unit 1 receives the signal of frequency fU (step S5), converts the signal into a signal of frequency fD (step S6) and retransmits the converted signal (step S7).

All work stations $WA_I$ to $WA_n$ receive the radio signals from unit 1 (step S8). Each station WA takes synchronization of the reception data in accordance with the sync flag (step S9) and checks the destination address (step S10). Transmit/receive circuit 18 checks whether the destination address coincides with an address assigned to a work station to which circuit 18 belongs (step S11). If the addresses do not coincide with each other, a reading operation is interrupted thereafter (step S12). Meanwhile, if the addresses coincide with each other, circuit 18 converts the reception serial data into parallel data, stores the converted data into a buffer or the like and informs CPU 11 of this reception (step S13). Circuit 18 outputs the reception data to bus 22 under the control of CPU 11 (step S14). In this manner, data can be transmitted/received between the work stations through the head end unit.

Figure 6:
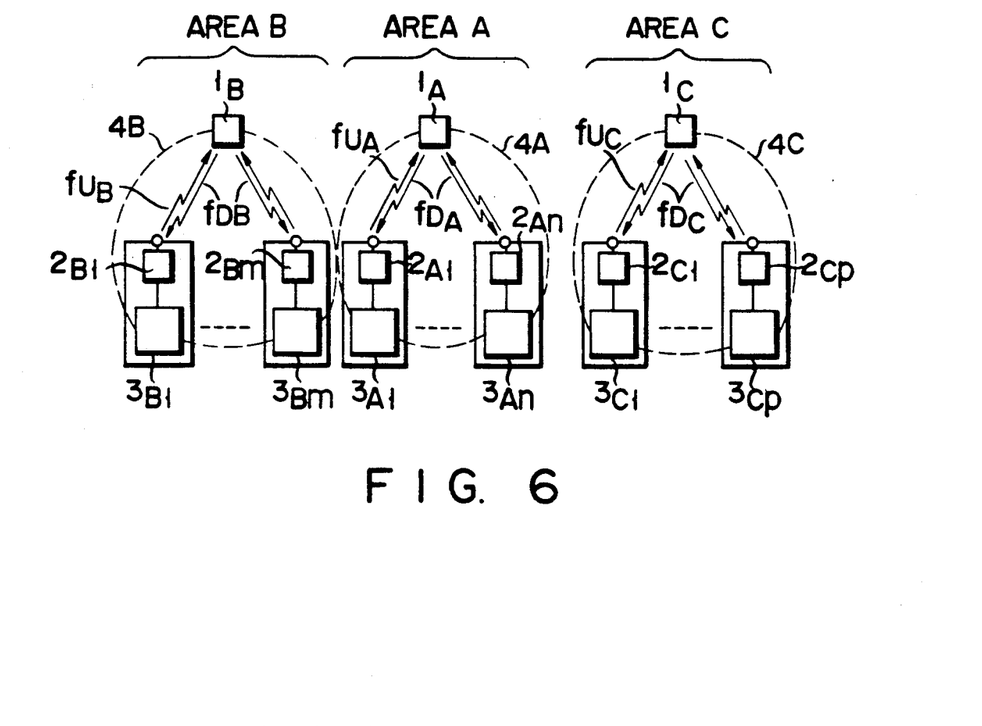
FIG. 6 is a block diagram showing an arrangement of a network system according to a second embodiment of the present invention.

If the network system using radio signals is enlarged in scale, a plurality of head end units must be used to constitute network systems in units of specific areas. FIG. 6 shows the second embodiment in which three network systems are formed in three areas A, B and C, respectively. In FIG. 6, head end units 1A to 1C and work stations $WA_{A1}$-$WA_{An}$ to $WA_{C1}$-$WA_{Cp}$ constitute local area networks 4A to 4C, respectively.

If areas A, B and C are arranged adjacent to each other and radio signals of the same frequency are used in the respective areas, interference of the radio signals or the like occurs between the areas. For this reason, data must be transmitted/received by different channels (transmission/reception frequencies) in the respective areas. Therefore, in this embodiment, a frequency band is divided into a transmission band and a reception band and different frequencies are used in areas A to C.

In an arrangement of the network systems according to the second embodiment (FIG. 6), different channels (frequencies) are used in the respective areas, therefore a work station used in a certain area cannot be directly used in another, so a transmit/receive circuit of the work station must be replaced or readjusted. However, replacement or readjustment of a transmit/receive circuit performed each time a work station is moved is very troublesome.

Therefore, in a third embodiment to be described later, each work station automatically detects a channel to be used in an area to which it belongs and automatically changes reception and transmission frequencies.

Figure 8:
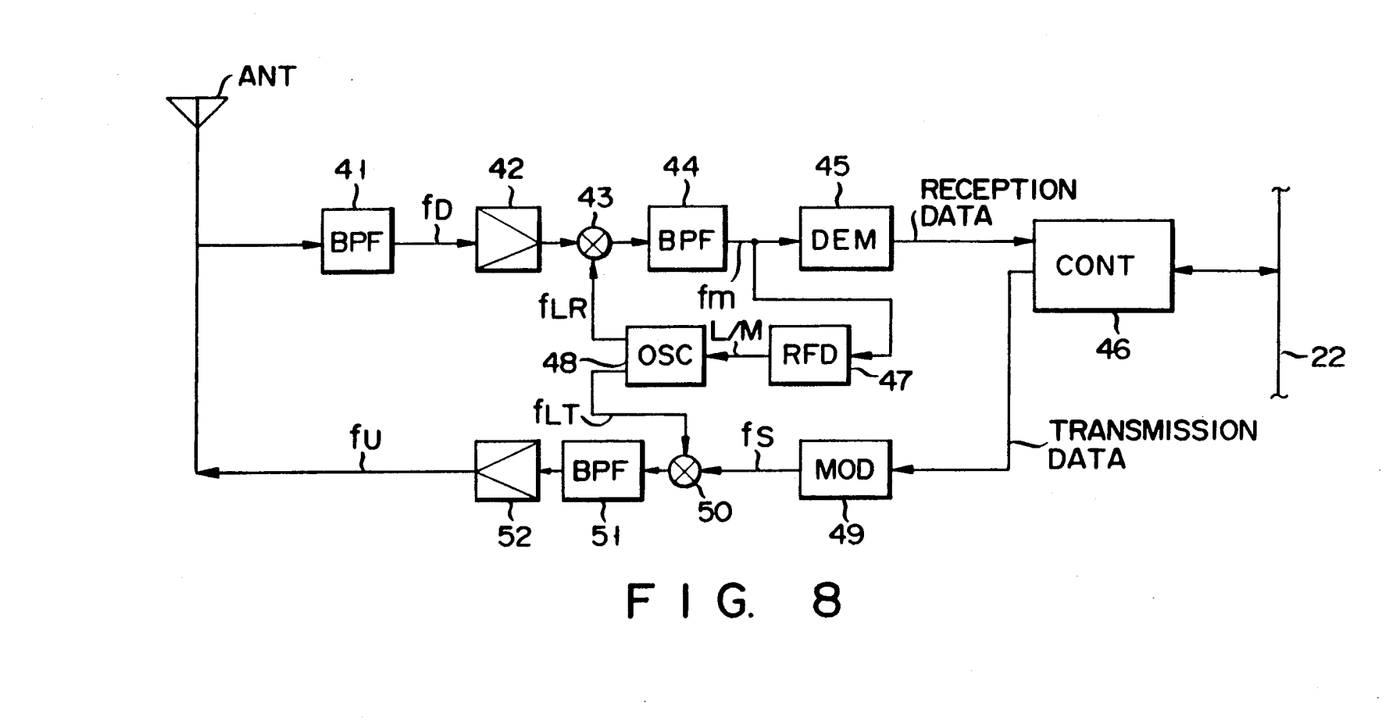
FIG. 8 is a block diagram showing an arrangement of a transmit/receive circuit used in a network system according to a third embodiment of the present invention.

An overall arrangement of a network system according to the third embodiment is substantially the same as that shown in FIG. 6, and a basic arrangement of a work station is substantially the same as that shown in FIG. 2. In order to automatically change a frequency, however, head end units 1A to 1C output corresponding radio signals normally (continuously) or at predetermined periods. Transmit/receive circuit 18 (2 in FIG. 6) is arranged as shown in FIG. 8. In FIG. 8, a reception RF signal is supplied to wideband filter 41, which limits the reception signal to a reception frequency area as shown in FIG. 3. An output signal from filter 41 is supplied to receiving amplifier 42. An output signal from amplifier 42 is mixed with a signal of frequency fLR to be described later by mixer 43, which supplies an output signal to band-pass filter (BPF) 44. BPF 44 has center frequency fm and a comparatively narrow passband width (i.e., passband width required for data transmission). BPF 44 then outputs a signal to demodulator 45, which supplies output data to transmission/reception controller 46 and controller 46 then checks the destination address assigned to the reception data. If controller 46 determines that the data is addressed to its own work station, controller 46 converts the data into parallel data and outputs the converted data. The reception data supplied to CPU 11 is used in a variety of data processing. If controller 46 determines that the data is addressed to another work station, controller 46 neglects it.

The output signal from BPF 44 is also supplied to reception frequency detector 47. Detector 47 checks whether a signal level of the input signal exceeds a predetermined level. If detector 47 determines that the signal level of the input signal exceeds the predetermined level, detector 47 outputs frequency fixing control signal L to local oscillator 48. If detector 47 determines that the signal level of the input signal is at the predetermined signal level or less, detector 47 outputs oscillation frequency variable control signal M to oscillator 48. Oscillator 48 is e.g., a VFO which oscillates at a fixed frequency in response to fixing control signal L or continuously changes its oscillation frequency in response to variable control signal M. Oscillator 48 supplies a signal of frequency fLR to mixer 43 in response to the output signal from detector 47.

Controller 46 converts transmission data into serial data and supplies the serial data to modulator 49, which modulates the transmission data into a signal of frequency fs and supplies an output signal to mixer 50. Mixer 50 then mixes the signal of frequency fs from modulator 49 with the signal of frequency fLT from oscillator 48 so that the signal of frequency fs is converted into a signal of frequency fU. An output signal from mixer 50 is supplied to band-pass filter (BPF) 51 for passing an RF signal of a transmission frequency band. A signal output from filter 51 is amplified by output amplifier 52 and sent as a transmission signal (carrier wave fU) from antenna ANT.

An operation of the circuit shown in FIG. 8 will be described below.

For the sake of better understanding, assume that a work station having the circuit shown in FIG. 8 is currently used in area A.

In this embodiment, head end units 1A to 1C normally output corresponding radio signals. In a reception operation, the work station receives at antenna ANT an RF signal of frequency (frequency of a carrier wave) fD transmitted from unit 1A, and BPF 41 of the work station limits the signal to a reception frequency band. The reception signal is amplified by amplifier 42 and supplied to mixer 43. Mixer 43 also receives a local signal of frequency $fLR_A$ for area A generated by local oscillator 48, mixes the reception signal of frequency $fD_A$ with the local signal of frequency $fLR_A$, and outputs an intermediate frequency signal of frequency fm ($fm = fD_A - fLR_A$). The intermediate frequency signal is supplied to BPF 44 and passed therethrough. The signal output from BPR 44 is supplied to demodulator 45 and reception frequency detector 47. Demodulator 45 demodulates the reception signal passed through BPF 44 and generates serial data. Controller 46 checks a destination address of the serial data. If controller 46 determines that the data is addressed to its own work station, controller 46 converts the data into parallel data and supplies the parallel data to CPU 11.

In the above state, since the output signal from mixer 43 passes through BPF 44, detector 47 detects that a signal level of the input signal exceeds a reference value. For this reason, detector 47 outputs oscillation frequency fixing control signal L, and therefore oscillator 48 continuously outputs oscillation frequency $fLR_A$. As a result, a reception state is maintained.

In a transmission operation, transmission data output from CPU 11 is supplied to transmission/reception controller 46. Controller 46 converts the transmission data into serial data and supplies the serial data to modulator 49, which modulates the transmission data into a signal of frequency fs and supplies the signal to mixer 50. Mixer 50 mixes the signal of frequency $fLT_A$ for area A supplied from oscillator 48 with the signal of frequency fs. BPF 51 extracts only a signal of frequency fUA ($= fLT_A - fs$) for area A. An output signal from BPF 51 is radiated from antenna ANT. In this manner, the work station transmits/receives the data in area A.

Assume that the work station is moved to area B.

As described above, head end unit 1B in area B normally outputs a signal of frequency $fD_B$, and the work station receives the signal at antenna ANT. Immediately after the work station is moved to area B, however, the frequency of an output signal from oscillator 48 is $fLR_A$, so that a frequency ($= fD_B - fLR_A$) of an output signal from mixer 43 is not fm. Therefore, the signal level of an output signal from BPF 44 becomes substantially zero or near. For this reason, reception frequency detector 47 detects that the input signal level is a reference value or less and outputs frequency variable control signal M. In response to signal M, oscillator 48 gradually changes an oscillation frequency to increase/decrease the frequency of an output signal. When the frequency of the output signal becomes a predetermined level (frequency $fL_{RB}$ ($= fD_B + fm$) for area B), the frequency of the output signal from mixer 43 becomes fm. As a result, the output signal from mixer 43 passes through BPF 44. Since the signal passes through BPF 44, detector 47 detects that the input signal level exceeds the reference value and outputs frequency fixing control signal L. In response to signal L, oscillator 48 continuously outputs a signal of frequency $fL_{RB}$ different from frequency $fLR_A$ in area A, thereby maintaining a reception state of the work station in area B.

Figure 7:
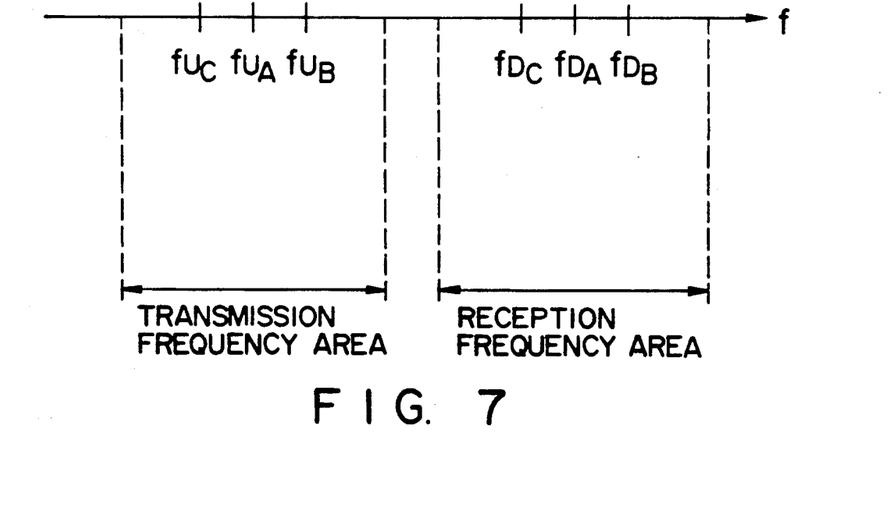
FIG. 7 is a schematic view showing a positional relationship of frequencies used in the network system shown in FIG. 6.

If a frequency relationship as shown in FIG. 7 is adopted in areas A, B and C, oscillator 48 changes frequency fLT by an amount identical to a change amount ($= fLR_A - fLR_B$) of the frequency. That is, oscillator 48 outputs a signal of a frequency with which the frequency of an output signal from mixer 50 becomes $fU_B$ to mixer 50. For this reason, the frequency of the output signal from mixer 50 becomes $fU_B$ to enable data transmission from the work station to head end unit 1B in area B.

In this embodiment, reception frequency detector 47 detects the signal level of the output signal from BPF 44 and thereby checks whether a signal of a frequency corresponding to a channel of an area to which detector 44 belongs is correctly received. If detector 47 determines that the signal is not correctly received, frequency fLR is changed to select a channel. After the channel is selected, the reception and transmission states are fixed to the channel.

In this manner, in the third embodiment, each work station automatically selects a channel of an area to which it belongs. For this reason, if a certain work station is moved to another area, the work station can be directly used without performing any channel switching operation and the like.

In the third embodiment, head end units 1A to 1C normally output radio signals. Such a head end unit can be easily obtained by adding, to the arrangement shown in FIG. 3, an oscillator for normally oscillating at frequency fD and a circuit for adding an output from the oscillator to an output signal from BPF 36.

The present invention is not limited to the circuit arrangements of the above embodiments but can be modified. For example, instead of the circuit shown in FIG. 8, a frequency of a signal having the highest signal level of reception signals may be detected to calculate frequencies fLR and fLT, so that oscillator 48 outputs a signal of this frequency. If a difference between frequencies fm and fs is substantially the same as the width of the transmission or reception band, frequencies fLR and fLT may be identical. In addition, the frequencies used in the respective areas have predetermined intervals in the arrangement in FIG. 7, but they may be arbitrarily arranged. Moreover, in the arrangement in FIG. 8, an oscillation frequency of oscillator 48 is continuously changed. However, a table storing oscillation frequencies for all the areas may be prepared in advance to change the oscillation frequencies step-by-step in accordance with the contents of the table.

In the network system of the third embodiment, data cannot be transmitted/received between work stations belonging to different areas. For this reason, various types of software or hardware sources cannot be commonly used in a plurality of areas. For example, a single high-speed printer or a data base cannot be commonly used in areas A to C. In order to solve the above problem, in a fourth embodiment to be described below, data transmission is enabled between work stations belonging to different areas.

A network system according to the fourth embodiment will be described below with reference to FIG. 9.

Figure 9:
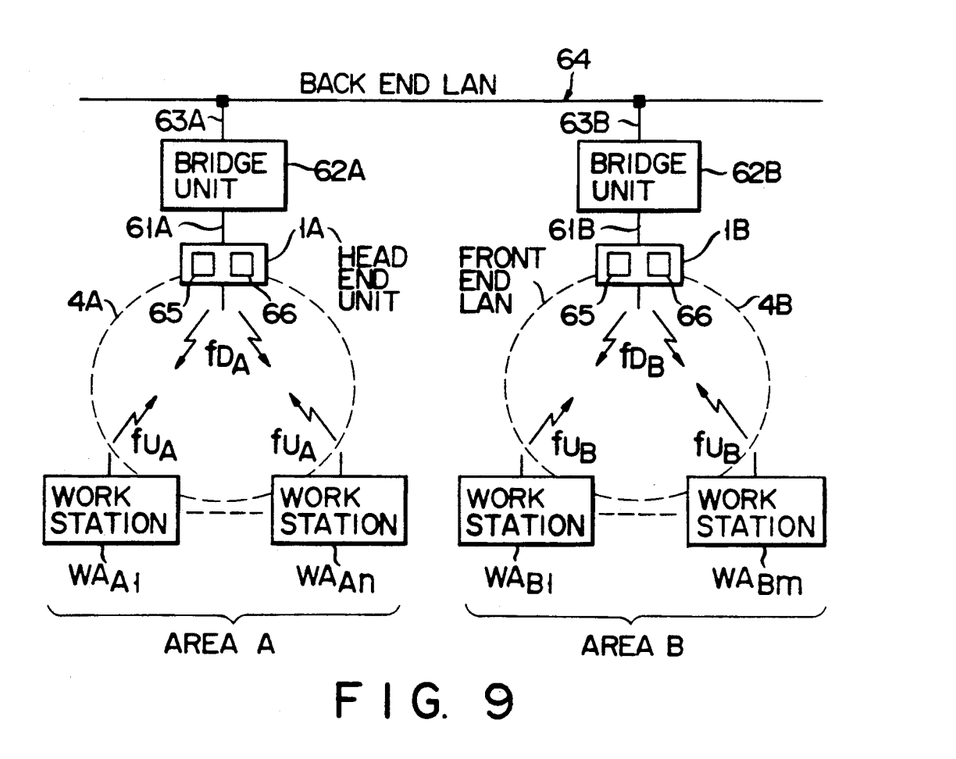
FIG. 9 is a block diagram showing an arrangement of a network system according to a fourth embodiment of the present invention.

In a system shown in FIG. 9, data transmission can be performed between LANs $4_A$ and $4_B$ located in areas A and B, respectively, in FIG. 6. In FIG. 9, therefore, the same reference numerals as in FIG. 6 denote the same parts. The system shown in FIG. 9 comprises, e.g., taken-controlled type radio front end LANs $4_A$ and $4_B$ located in areas A and B, respectively, CSMA/CD (Carrier Sense Multiple Access/Collision Detection)-controlled type back end LAN 64 for mutual data transmission between LANs $4_A$ and $4_B$, and bridge units $62_A$ and $62_B$ having a relay function for connecting LANs $4_A$ and $4_B$ with LAN 64, respectively.

As in the arrangement shown in FIG. 6, front end LANs $4_A$ and $4_B$ respectively comprise work stations $WA_{Al}$ to $WA_{An}$ and $WA_{Bl}$ to $WA_{Bm}$, and head end units $1_A$ and $1_B$. Bridge units $62_A$ and $62_B$ and back end LAN 64 are connected by cables $63_A$ and $63_B$. Bridge units $62_A$ and $62_B$ and head end units $1_A$ and $1_B$ are connected by cables $61_A$ and $61_B$.

In this embodiment, each of head end units $1_A$ and $1_B$ comprises circuit 65 shown in FIG. 3, and circuit 66, having an arrangement similar to that of the circuit shown in FIG. 8, for demodulating and supplying reception data to a corresponding one of bridge units $62_A$ and $62_B$ and converting data supplied from a corresponding one of units $62_A$ and $62_B$ into a radio signal and outputting the signal. (If the reception and transmission frequencies are fixed, reception frequency detector 47 and the like need not be used.)

Figure 10:
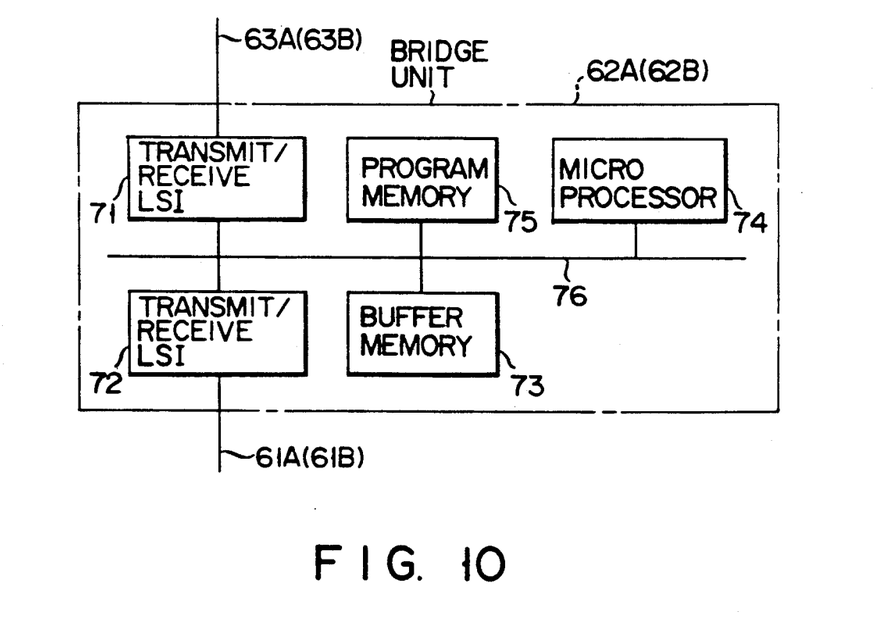
FIG. 10 is a block diagram showing an arrangement of a bridge unit shown in FIG. 9.

Referring to FIG. 10, an arrangement of each of bridge units $62_A$ and $62_B$ will be described. Unit $62_A$ ($62_B$) comprises: transmit/receive LSI (transmission/-reception interface LSI) 71, connected to cable $63_A$ ($63_B$), for CSMA/CD control; token control transmit/-receive LSI 72 connected to cable $61_A$ ($61_B$); data buffer memory 73; microprocessor 74 for controlling overall unit $62_A$ ($62_B$); memory 75 for storing operation programs and the like of microprocessor 74; and internal bus 76 for mutually connecting LSIs 71 and 72, buffer memory 73, microprocessor 74 and memory 75.

A predetermined area of memory 75 has a management table representing a relationship between sources (addresses inherent in the sources) such as the respective work stations in the system and the LANs to which the respective sources belong.

An operation of the fourth embodiment will be described below.

Assume that data is to be transmitted from work station $WA_{Al}$ to $WA_{An}$ in a single LAN. In this case, station $WA_{Al}$ transmits data having a destination address representing station $WA_{An}$ at its header portion to head end unit $1_A$. Unit $1_A$ receives the data and transmits a radio signal of frequency $fD_A$ to work stations WAAl to $WA_{An}$, and at the same time supplies the reception data to bridge unit $62_A$ through cable $61_A$. Each of stations $WA_{Al}$ to $WA_{An}$ receives the radio signal from unit $1_A$ and fetches the data therein only when the destination address coincides with its own address. In this case, only station $WA_{An}$ fetches the reception data.

The data transmitted from unit $1_A$ to unit $62_A$ is received by LSI 72 and stored in buffer memory 73 by a DMA through internal bus 76. When the data is stored in memory 73, microprocessor 74 retrieves the management table in memory 75 using the destination address assigned to the data. If microprocessor 74 determines by this retrieval that the data (reception data from unit $1_A$) is not destined to a work station in front end $LAN_{4A}$, microprocessor 74 sends the data to back end LAN 64.

Alternatively, if microprocessor 74 determines that the data is destined to a work station in $LAN_{4A}$, microprocessor 74 disposes the data and interrupts data transmission (relay) to LAN 64. Therefore, since the data is transmitted from station $WA_{Al}$ to $WA_{An}$ in this case, the data flows through only $LAN_{4A}$.

The above operation is similarly performed in mutual communication between arbitrary work stations in $LAN_{4A}$ or in $LAN_{4B}$ installed in area B.

Mutual communication between front end LANs $4_A$ and $4_B$ will be described below assuming that data is transmitted from work station $WA_{An}$ to $WA_{Bm}$. First, data is transmitted by a radio signal of frequency $fU_A$ from station $WA_{An}$ to head end unit $1_A$. Unit $1_A$ receives the transmission data. Unit $1_A$ converts the reception data into a radio signal of frequency $fD_A$ and transmits the signal to stations $WA_{Al}$ to $WA_{An}$. In this case, stations $WA_{Al}$ to $WA_{An}$ check a destination address of the data and neglects the data. Unit $1_A$ also supplies the reception data to bridge unit $62_A$. The data (transmission data from station $WA_{An}$) supplied from unit $1_A$ to unit $62_A$ is received by LSI 72 in unit 62" and stored in buffer memory 73. Microprocessor 74 in unit $62_A$ retrieves a management table in memory 75 using the destination address assigned to the data stored in memory 73. If microprocessor 74 determines that the data is not destined for any of stations $WA_{Al}$ to $WA_{An}$, it sends the data to back end LAN 64 through internal bus 76, LSI 71, and cable $63_A$.

Data (transmission data from station $WA_{Al}$) on back end LAN 64 is supplied to bridge unit $62_B$ through cable $63_B$. LSI 71 in unit $62_B$ receives data on LAN 64 through cable $63_B$ and stores it in buffer memory 73. Microprocessor 74 in unit $62_B$ retrieves a management table in memory 75 using the destination address assigned to the data stored in memory 73. If microprocessor 74 determines that the data is destined to a work station (in this case, station $WA_{Bm}$) in $LAN_{4B}$, microprocessor 74 supplies the data to head end unit $1_B$ through internal bus 76, LSI 71 and cable $61_B$. Unit $1_B$ transmits the data supplied from bridge unit $62_B$ to stations $WA_{Bl}$ to $WA_{Bm}$ by radio signals of frequency $fD_B$. Each of stations $WA_{Bl}$ to $WA_{Bm}$ receives the radio signal of frequency $fD_B$ and fetches the data therein only when the destination address of the data coincides with its own address. Otherwise, each station disposes the data. In this case, only station $WA_{Bm}$ fetches the reception data (transmission data from station $WA_{An}$) therein.

In the above embodiment, two front end LANs are connected to back end LAN. The present invention, however, can be applied to a system in which three or more front end LANs are connected to a back end LAN.

In this embodiment, units 1A and 1B output a signal of, frequency $fD_A$ and a signal of frequency $fD_B$ when they receive a signal of frequency $fU_A$ and a signal of frequency $fU_B$. Alternatively, they can output signal of frequencies $fD_A$ and $fD_B$ only when bridge circuits $62_A$ and $62_B$ determine that the received data is destined to any work station incorporated in local area network LANs $4_A$ and $4_B$ to which units $62_A$ and $62_B$ belong, respectively.

According to the fourth embodiment, the various sources can be shared in the system, and transmission data significant in only a certain front end LAN is not sent to a back end LAN. As a result, the back end LAN can be efficiently used.

As has been described above, according to the present invention, (1) a network system can be arranged using radio signals, (2) radio network systems can be arranged in units of areas, (3) when a plurality of radio network systems are arranged, each network system can be rearranged without any trouble if a work station is moved therein, and (4) data transmission can be performed between work stations located in different areas so that various sources can be shared in the system. In addition, since data significant to only a certain front end LAN is not transmitted to a back end LAN, the back end LAN can be efficiently used.

What is claimed is:

1. A network system, comprising:
   a plurality of work station means for mutually transmitting data by radio signals through head end means; and
   head end means for receiving a radio signal of a first frequency from all of said work station means, converting the received radio signal into a radio signal of a second frequency, different from the first frequency, and transmitting the converted signal to all of said work station means,
   wherein each of said work station means includes:
   data processing means for performing data processing, receiving transmission data including a destination address supplied from one of said plurality of work station means, and generating transmission data to be transmitted to another of said plurality of work station means,
   receiving means, connected to said data processing means, for receiving the radio signal of the second frequency from said head end means, demodulating the radio signal to obtain data supplied from the one of said plurality of work station means, and supplying the obtained data to said data processing means; and
   transmitting means, connected to said data processing means, for receiving the transmission data generated by said data processing means, and converting the transmission data into the radio signal of the first frequency and radiating the radio signal, thereby transmitting the transmission data to said another of said plurality of work station means through said head end means.

2. A system according to claim 1, wherein said head end means comprises:
   receiving means for receiving the radio signal of the first frequency;
   converting means, connected to said receiving means, for converting the frequency of the radio signal of the first frequency into the radio signal of the second frequency, and
   radiating means, connected to said converting means, for radiating an output signal from said converting means.

3. A system according to claim 1, wherein said receiving means comprises:
   antenna means for receiving the radio signal of the second frequency;
   demodulating means, connected to said antenna means, for demodulating the radio signal from said antenna means to obtain serial data; and
   checking means, connected to said demodulating means, for checking the destination address contained in the serial data, and for supplying the serial data to said data processing means at times when the work station to which the receiving means belongs has an address which coincides with the destination address.

4. A system according to claim 1, wherein the transmission data generated by said data processing means includes a destination address; and
   wherein said transmitting means comprises:
   intermediate-frequency converting means, connected to said data processing means, for receiving the transmission data generated by said data processing means, converting the transmission data into serial data, and converting the serial data into an intermediate-frequency signal;
   first frequency converting means, connected to said intermediate frequency converting means, for converting the intermediate-frequency signal into the signal of the first frequency; and
   antenna means, connected to said first-frequency converting means, for radiating the radio signal of the first frequency.

5. A system according to claim 1, wherein said data processing means comprises:
   central processing means for receiving the obtained data from said receiving means and performing data processing based on the obtained data, and for generating the transmission data;
   memory means for storing a program for defining an operation of said central processing means; and
   bus means for connecting said central processing means, said memory means, said receiving means and said transmitting means, and transmitting the obtained data and the transmission data.

6. A system according to claim 1, wherein:
   said data processing means includes means for generating the transmission data including the destination address and supplying the transmission data to said transmitting means;
   said transmitting means includes means for converting the transmission data into serial data, modulating the serial data, converting the modulated serial data into a radio signal, and transmitting the radio signal; and
   said receiving means includes means for checking the destination address included in the obtained data and for supplying the obtained data to said data processing means if the work station to which the receiving means belongs has an address which coincides with the destination address.

7. A system according to claim 1, wherein said receiving means comprises:
   detecting means for detecting the frequency of the radio signal received from the head end means;
   means, connected to said detecting means, for changing the reception frequency to correspond with the radio signal from the head end means when the frequency detected by the detection means is different from a reference frequency.

8. A system according to claim 1, wherein the head end means includes a plurality of head end means,
   transmission and reception frequencies of said plurality of head end means are different from each other, and
   a plurality of work station means corresponding to each of said head end means constitute a local area network.

9. In a network system comprising:
   head end means for receiving a radio signal of a first frequency, converting the received radio signal into a radio signal of a second frequency, different from the first frequency, and transmitting the converted signal; and a plurality of work station means for mutually transmitting data by radio signals through said head end means, each of said work station means comprising data processing means for performing data processing, receiving data supplied from one of said plurality of work station means, and generating data to be transmitted to another of said plurality of work station means, receiving means, connected to said data processing means, for receiving the radio signal of the second frequency from said head end means, demodulating the radio signal to obtain data supplied from the one of said plurality of work station means, and supplying the obtained data to said data processing means, and transmitting means, connected to said data processing means, for receiving the transmission data generated by said data processing means, and converting the transmission data into the radio signal of the first frequency and radiating the radio signal, thereby transmitting the transmission data to said another of said plurality of work station means through said head end means;

a data transmission method, comprising the steps of:

generating transmission data including a destination address and supplying the transmission data to said transmitting means by said data processing means of a certain work station means;

converting the received transmission data into serial data, modulating the serial data, converting the modulated serial data into a radio signal and transmitting the radio signal by said transmitting means of said certain work station means;

receiving a radio signal of a first frequency from said certain work station means, converting the radio signal into a radio signal of a second frequency different from the first frequency and transmitting the radio signal by said head end means;

receiving the radio signal of the second frequency, demodulating the radio signal, and checking a destination address included in the reception data by said receiving means of all the work station means; and supplying the reception data by said receiving means of one of said plurality of work station means having an address which coincides with the destination address, to a corresponding one of said data processing means.

10. A network system, comprising:

a plurality of head end means for receiving a radio signal of a first frequency, converting the received radio signal into a radio signal of a second frequency, and transmitting the converted signal, wherein each of said plurality of head end means continuously or periodically outputs a corresponding radio signal, and the transmission and reception frequencies of each of said plurality of head end means are different from each other; and a plurality of work station means corresponding to each of said head end means for mutually transmitting data by radio signals through the corresponding head end means, the plurality of work station means and the corresponding head end means constituting a local area network, each of said work station means comprising:

data processing means for performing data processing, receiving data supplied from one of said plurality of work station means, and generating data to be transmitted to another of said plurality of work station means, receiving means, connected to said data processing means, for receiving the radio signal of the second frequency from the corresponding head end means, demodulating the radio signal to obtain data supplied from the one of said plurality of work station means, and supplying the obtained data to said data processing means; wherein said receiving means comprises:

detecting means for detecting a frequency of received radio signal; and means, connected to said detecting means, for receiving a signal representing a detection result, and when said detecting means detects that the frequency of the reception signal is different from a reference frequency, changing and resetting the reception frequency to correspond with the radio signal from the corresponding head end means; and transmitting means, connected to said data processing means, for receiving the transmission data generated by said data processing means, and converting the transmission data into the radio signal of the first frequency and radiating the radio signal, thereby transmitting the transmission data to said another of said plurality of work station means through said head end means.

11. A method of operating work station means in a network system according to claim 10, in which said work station means is moved to another local area network, comprising the steps of:

detecting, after movement, that the signal level of the received radio signal is different from the reference level by said detecting means;

changing the reception frequency of said receiving means by said resetting means; and when the reception frequency of said receiving means coincides with the frequency of the radio signal output from head end means constituting said other local area network, fixing the reception frequency in response to detection in said detecting step so that the reception frequency coincides with the frequency of the radio signal output from said front end means of said other local area network.

12. A system according to claim 10, wherein said resetting means includes means for resetting the frequency of the transmission signal to a frequency corresponding to the reception frequency so that the transmission frequency coincides with the frequency of the radio signal received by said head end means of said other local area network.

13. A network system, comprising:

a plurality of head end means for receiving radio signal of a first frequency, converting the received radio signal into a radio signal of a second frequency, and transmitting the converted signal, wherein the transmission and reception frequencies of each of said plurality of head means are different from each other;

a plurality of work station means corresponding to each of said head end means for mutually transmitting data by radio signals through the corresponding head end means, the plurality of work station means and the corresponding head end means constituting a local area network, each of said work station means comprising:

data processing means for performing data processing, receiving data supplied from one of said plurality of work station means, and generating data to be transmitted to another of said plurality of work station means;

receiving means, connected to said data processing means, for receiving the radio signal of the second frequency from the corresponding head end means, demodulating the radio signal to obtain data supplied from the one of said plurality of work station means, and supplying the obtained data to said data processing means; and transmitting means, connected to said data processing means, for receiving the transmission data generated by said data processing means, and converting the transmission data into the radio signal of the first frequency and radiating the radio signal, thereby transmitting the transmission data to said another work station means through said head end means;

a plurality of bridge means connected to said plurality of head end means in a one-to-one correspondence; and transmitting means, connected to each of said plurality of bridge means, for transmitting data, wherein each of said plurality of head end means comprises means for demodulating a received radio signal to obtain transmission data, supplying the transmission data to said corresponding bridge means, and modulating output data from said corresponding bridge means into the radio signal of the second frequency and radiating the radio signal, and each of said plurality of bridge means comprises means for outputting the demodulated data from said corresponding head end means to said transmitting means, receiving data supplied from another bridge means through said transmitting means, and supplying the data to said corresponding head end means.

14. A system according to claim 13, wherein each of said bridge means checks the address included in the data from said corresponding head end means and outputs the data to said transmitting means only when the data is destined for work station means corresponding to another bridge means, and said bridge means checks the address of the data in said transmitting means, and receives only data destined to work station means corresponding to said bridge means and outputs the data to said corresponding head end means.

15. A work station for use in a network system in which a plurality of work stations transmit and receive data by radio signals through head end means, wherein said head end means is assigned with a first channel including a radio signal of a first frequency band and a second channel including a radio signal of a second frequency band, and said head end means receives a signal through said first channel, outputs the received signal through said second channel, and continuously or periodically outputs a radio signal through said second channel, each of said work stations comprising:

means for processing reception data and generating transmission data;

receiving means for receiving the radio signal output from said head end means, and for converting the received radio signal into a signal of a specific frequency regardless of the frequency of the radio signal output from said head end means, wherein said receiving means comprises:

antenna means for receiving radio signals, detecting means, connected to said antenna means, for detecting the radio signal which is output from said head end means, from the radio signals received by said antenna means, and means, connected to said detecting means, for setting a reception frequency of said work station means in accordance with the detection result of said detecting means;

means, connected to said receiving means and said data processing means, for demodulating the output signal from said receiving means to obtain reception data supplied from one of said plurality of work stations; and means for modulating the transmission data, output from said processing means, into a radio signal of a frequency corresponding to the received radio signal and outputting the modulated radio signal, thereby transmitting the data to another of said plurality of work stations.

16. A work station for use in a network system in which a plurality of work stations transmit and receive data by radio signals through head end means, wherein said head end means is assigned with a first channel including a radio signal of a first frequency band and a second channel including a radio signal of a second frequency band, and said head end means receives a signal through said first channel, outputs the received signal through said second channel, and continuously or periodically outputs a radio signal through said second channel, each of said work stations comprising:

means for processing reception data and generating transmission data;

receiving means for receiving the radio signal output from said head end means, and for converting the received radio signal into a signal of a specific frequency regardless of the frequency of the radio signal output from said head end means, wherein said receiving means comprises:

a antenna, first mixing means for mixing an output signal from said antenna with a first local oscillation signal, detecting means for detecting whether a frequency of an output signal from said first mixing means substantially coincides with the specific frequency, and oscillating means, connected to said detecting means, for changing the frequency of the first local oscillation signal when the frequency of the output signal from said first mixing means does not coincide with the specific frequency, and fixing the frequency of the first local oscillation signal when the output signal from said first mixing means coincides with the specific frequency;

means, connected to said receiving means and said data processing means, for demodulating the output signal from said receiving means to obtain reception data supplied from one of said plurality of work stations; and means for modulating the transmission data, output from said processing means, into a radio signal of a frequency corresponding to the received radio signal and outputting the modulated radio signal, thereby transmitting the data to another of said plurality of work stations through said head end means, wherein said means for modulating the transmission data comprises:
- modulating means for modulating transmission data into a signal of predetermined frequency,
- second mixing means for mixing an output signal from said modulating means with a second local oscillation signal and generating a radio frequency signal, and
- means, connected to said detecting means, for changing a frequency of the second local oscillation signal to be supplied to said second mixing means in accordance with a change in frequency of the local oscillation signal so that the frequency of the transmission signal corresponds to the frequency of the received radio signal.

17. A network system, comprising:
- a plurality of radio front end local area network means, using different transmission/reception frequencies, for transmitting data;
- back end local area network means for mutually transmitting data between said plurality of front end local area network means; and
- bridge means, provided for each of said front end local area network means, for mutually connecting a corresponding front end local area network means with said back end local area network means, wherein said bridge means includes:
- means for receiving data from corresponding front end local area network means,
- means for checking the destination address of the received data from the corresponding front end local area network means, and if the data is destined to another front end local area network means, supplying the received data to said back end local area network means,
- means for receiving data from said back end local area network means, and
- means for checking a destination address of the received data from said back end local area network means, and if the data is destined to corresponding front end local area network means, supplying the data to said corresponding front end local area network means.

18. A system according to claim 17 wherein each of said front end local area networks comprises:
- head end means for converting a received radio signal into a radio signal of a frequency different from a frequency of the received signal, demodulating the received signal, and sending the demodulated signal to corresponding said bridge means, and converting data supplied from said bridge means into a radio signal and outputting the converted radio signal, and
- a plurality of work station means for performing data processing, each of said work station means transmitting data to a corresponding one of said head end means by a radio signal, thereby transmitting the data to another work station means, and receiving data from another work station means by a radio signal through said head end means.

19. A network system comprising:
- a plurality of radio front end local area networks using different frequencies for transmitting and receiving data;
- a back end local area network for mutually transmitting data between said plurality of front end local area networks; and
- bridge means, provided for each of said front end local area network means, for mutually connecting a corresponding front end local area network with said back end local area network, wherein said bridge means comprises
- first means for receiving data from the corresponding front end local area network,
- first check means, connected to said first receiving means, for checking a destination address of the data received from the corresponding front end local area network, and if the data is destined for another front end local area network, supplying the received data to said back end local area network,
- second means for receiving data from said back end local area network, and
- second checking means, connected to said second receiving means, for checking a destination address of the data received from the back end local area network, and if the data is destined to the corresponding front end local area network, supplying the data to the corresponding front end local area network.

20. A network system comprising:
- a plurality of radio front end local area networks using different frequencies for transmitting and receiving data;
- a back end local area network for mutually transmitting data between said plurality of front end local area networks; and
- bridge means, provided for each of said front end local area networks, for mutually connecting a corresponding front end local area network with said back end local area network, wherein each of said front end local area networks comprises
- head end means for receiving a radio signal of a first frequency, converting the received radio signal into a radio signal of a second frequency, different from the first frequency of the received signal, demodulating the received signal, and sending the demodulated signal to said bridge means, and for converting data supplied from said bridge means into a radio signal of the second frequency and outputting the converted radio signal, and
- a plurality of work station means for performing data processing, each of said work station means including means for transmitting data to said head end means by a radio signal, thereby transmitting the data to another work station means through said head end means, and means for receiving data from another work station by a radio signal through said head end means.

* * * * *